United States Patent
Rodriguez Sola et al.

(10) Patent No.: US 8,038,401 B2
(45) Date of Patent: Oct. 18, 2011

(54) WIND TURBINE BLADE WITH A LIGHT BEACON AT THE TIP

(75) Inventors: Rubèn Rodriguez Sola, Sarriguren (ES); Manuel López-Amo Sainz, Pamplona (ES); Ion Arocena de la Rua, Sarriguren (ES); Miguel Angel Erro Ibáñez, Pamplona (ES); Eneko Sanz Pascual, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 432 days.

(21) Appl. No.: 12/363,844

(22) Filed: Feb. 2, 2009

(65) Prior Publication Data
US 2009/0202351 A1    Aug. 13, 2009

(30) Foreign Application Priority Data
Feb. 8, 2008  (ES) .................................. 200800345

(51) Int. Cl.
*F03D 11/00*   (2006.01)
(52) U.S. Cl. ............................ 416/146 R; 438/5; 438/62
(58) Field of Classification Search ................ 416/5, 62, 416/146 R
See application file for complete search history.

(56) References Cited

U.S. PATENT DOCUMENTS

| | | | | |
|---|---|---|---|---|
| 6,867,710 | B2 * | 3/2005 | Wobben | 340/963 |
| 7,238,007 | B2 * | 7/2007 | Wobben | 416/5 |
| 2007/0160338 | A1 * | 7/2007 | Mortensen et al. | 385/134 |
| 2010/0221111 | A1 * | 9/2010 | Nieuwenhuizen | 416/61 |

FOREIGN PATENT DOCUMENTS

| | | | |
|---|---|---|---|
| DE | 10160360 | * | 6/2003 |
| EP | 1544460 | * | 6/2005 |
| GB | 2467295 | * | 7/2010 |
| WO | WO 03104648 | * | 12/2003 |
| WO | WO 2006/028481 | * | 3/2006 |
| WO | WO 2007068254 | * | 6/2007 |
| WO | WO 03/050412 | * | 6/2011 |

* cited by examiner

*Primary Examiner* — Asok Sarkar
(74) *Attorney, Agent, or Firm* — Ladas & Parry LLP

(57) ABSTRACT

Wind turbine blade (11) with a flashing beacon on its tip which is connected to the wind turbine rotor hub (13) where this beacon includes a lighting module (21) in the tip area of the blade (11) which is supplied by a device that includes a light emitter (23) situated in the hub (13) or in the root area of the blade (11), a light to electrical energy converter (27) connected directly to this lighting module (21) and a conductor (25) of light but not electrical energy from this light emitter (23) to this converter (27).

7 Claims, 1 Drawing Sheet

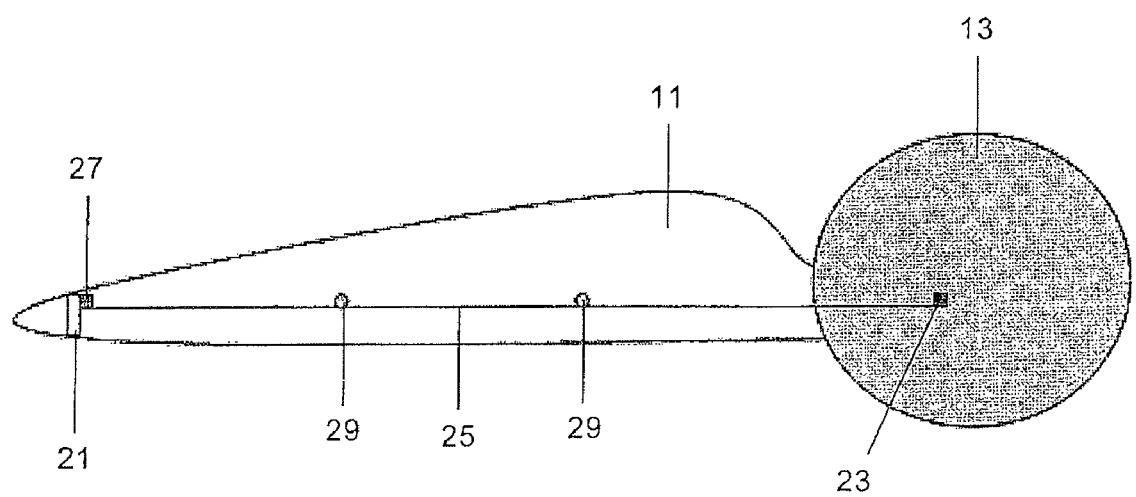

WIND TURBINE BLADE WITH A LIGHT BEACON AT THE TIP

FIELD OF THE INVENTION

The invention refers to wind turbines whose blades have light beacons at their tips.

BACKGROUND

In the wind industry the need for wind turbines to have light beacons to alert air traffic to their presence is well known. In fact, there are administrative regulations that require it when the maximum height that their blades reach exceeds certain pre-established limits.

In wind turbines of up to 2-3 MW, with rotors of 80-100 metres in diameter and total heights lower than 150 metres, the beacon system usually used consists in placing light sources on the nacelle of the wind turbine.

Nevertheless, in higher power wind turbines such as the new wind turbines of 4-5 MW, the rotors have diameters greater than 100 metres and the total height of the wind turbine exceeds 150 metres, which means that the beacon system should include light sources, not only on the nacelle of the generator, but also on the tip of the blade.

One known beacon system consists of placing a module with lamps or LEDs in the blade tip area, supplied with a conventional copper cable that runs from the hub of the rotor inside the blade to the tip. An example of this type of beacon system is described in WO 2006/028481.

One problem with this type of system is that it is not possible to ensure that the power supply cable to the lights or LEDs is not affected by lightning strikes despite having protection systems for this purpose. Moreover, there is the risk that this power supply cable acts as a point of entry for the lightning into the hub of the rotor and other areas of the wind turbine.

To avoid damage due to lightning strikes, both the wind turbine in general and the blades in particular are equipped with lightning protection systems. The wind turbine blades, typically manufactured from composite materials, constitute the most likely point for direct lightning strikes. For this reason, the majority of wind turbine blades are equipped with lightning receptors on the tip and in other areas of the blade connected to a lightning conductor cable that runs the entire length of the blade from the tip to the root. In the case of lightning striking the blade, the electromagnetic field induced in the area surrounding the conductor cable endangers any additional conductive elements in the blade. The lightning protection standards state that any conductive element in the blade must be connected electrically to the main lightning protection system of the blade. Nevertheless, this connection must be made carefully avoiding the deterioration of the conductive elements. In cases where the additional conductive elements are confined to a small and clearly delimited space, the protection system may consist of including these elements in a Faraday cage and connecting them through the protection devices belonging to the main lightning conductor cable. Nevertheless, if the additional conductive elements are long and are parallel to the main earthing conductor, their protection system is more complicated and its efficacy is not guaranteed. In the case of having a cable that runs parallel to the main lightning conductor cable, no system can be guaranteed to protect this cable against the effects of lightning with 100% efficacy.

Another known beacon system consists in placing the light sources on the hub of the rotor and guiding the light up to the tip of the blade using fibre optics or other means of transmission.

The documents WO 03/050412 and WO 2007/068251 describe systems like this.

These systems have the advantage that they do not include conductive elements in the blade and therefore are not exposed to the effects of lightning, but they have the inconvenience of a low efficiency in light transmission. When using fibre optics as means of transmission, the optimum efficiency that can be achieved when coupling the light to the fibre optic is very low (no more than 10%) and the resulting system is energy inefficient and costly. In addition, with current fibre optic technology and for the wavelength that must be used for lighting the tip of the blade (~620 nm) the power losses caused in a blade longer than 50 metres are very high.

This invention is directed at the solution of this problem.

SUMMARY OF THE INVENTION

One object of this invention is to provide a wind turbine with long blades with light beacons on the tips of the blades, with a high level of safety against lightning strikes.

Another object of this invention is to provide a wind turbine with long blades with light beacons on the tips of the blades, with a high level of energy efficiency.

Another object of this invention is to provide a wind turbine with long blades with light beacons on the tips of the blades that are easily maintained.

These and other objects of this invention result in a wind turbine that includes a rotor made up of one or several blades connected to a hub, in which at least one blade includes a lighting module on the tip of the blade, where this lighting module is supplied by a power supply system that is immune to the electromagnetic fields. This module includes a light emitter located in the hub or in the blade root area (the area of the blade adjacent to the hub), an optical-to-electrical energy converter connected directly to this lighting module and a light energy conductor that does not conduct electrical energy that runs the length of the blade from this light emitter to this converter.

This power supply device is based on the transmission of energy from the rotor hub (or the blade root) to the tip of the blade in the form of optical energy that is immune to the effects of lightning, thus not using electrical cables along the length of the blade. For its part, the lighting module and energy converter assembly, which is configured as the blade tip beacon module, is fitted with a system for lightning protection by caging the elements susceptible to damage by the lightning. This is done in such a way that it can be replaced if necessary, thus facilitating the blade repair.

In a preferred embodiment, the light emitter is a laser and the optical energy conductor is fibre optic. This achieves a very efficient beacon device as the laser achieves great efficiency when coupled with the fibre optics that, in addition to being a conductor that is immune to the electromagnetic fields, it is a very efficient means for the optical energy transmission and facilitates the routing through the blade.

Other characteristics and advantages of this invention can be inferred from the following description regarding the accompanying figures.

BRIEF DESCRIPTION OF FIGURES

FIG. 1 is a schematic view of a wind turbine blade with a light beacon according to this invention.

DETAILED DESCRIPTION OF PREFERRED EMBODIMENTS

The guiding idea of this invention lies in the use of a system for transmitting energy along the blade that is immune to the destructive effects of the lightning. The power supply system for the lighting module on the tip employs fibre optics for the transmission of the optical energy from the rotor hub to the tip of the blade to supply a photovoltaic cell capable of generating enough electrical power to supply a lighting module that emits light with the required wavelength and direction (in the aforementioned solutions of the previous technique, the optical energy transmitted by the fibre optics is used to light the tip of the blade directly).

FIG. 1 shows a wind turbine blade (11) connected to the rotor hub (13) with a light beacon according to one embodiment of this invention.

In the tip area of the blade (11) there is a lighting module (21) that includes a set of LEDs that emit rays of light with different orientations and a suitable wavelength, of the order of 620 nm. This module is not the specific object of this invention, which therefore covers any lighting module that meets the requirements of a light beacon on the tip of a wind turbine blade.

The power supply system for this lighting module (21) includes a light emitting device (23) situated in the hub (13) or in the root of the blade (11), a light conductor (25) and a light to electrical energy converter (27) connected to this lighting module (21).

In one embodiment of this invention, the light emitting device (23) is a laser emitter, the conductor (25) is a fibre optic and the converter (27) is a photovoltaic cell.

Preferably, the power of the laser is between 4 and 40 W to give a power at the tip of between 1 and 10 W and its wavelength is in the range of 750-950 nm. The selection of the laser wavelength is independent of the wavelength required for lighting the blade and its selection corresponds to efficiency criteria of the supply system. The global efficiency would typically be 25%.

By its part, the fibre optic is preferably a multimode optical fibre of 62.5 µm or 100 µm core diameter, of the type usually used in telecommunications routed through the inside of the blade. In a preferred embodiment, the fibre optic cable is routed through a small channel or conduit stuck to the web of the blade in such a way that, if a repair or replacement is necessary, it is simple to remove the fibre optic cable and route a new cable through the conduit.

The fibre optic cable may be formed by several sectors joined by intermediate connectors (29) to facilitate assembly and repair. This characteristic is particularly significant if the blade (11) is a split blade, as other types of beacons do not allow intermediate connectors.

The lighting module (21) and converter (27) assembly must have its own system for protection against lightning, such as a Faraday cage, connected to the standard lightning conductor system of the blade.

It is preferable that the lighting module (21) and the converter (27) be configured as a unitary assembly fitted in such a way that it may be replaced if necessary, thus facilitating the repair of the blades.

The main advantage of this invention with respect to the known solutions using cables that are conductors of electric current is that power supply cables that are electrical conductors are not used, consequently reducing the risk of failure due to the influence of lightning strikes on the blade.

With respect to the known solutions that use fibre optics, this invention presents the following advantages, among others:

It achieves great energy efficiency in light transmission as it is possible to use a laser as a light source with the light focused so that it achieves high efficiency when coupling the laser light in the fibre optics and the losses of light power in the fibre optics are less for wavelengths of 750-950 nm than for the lengths used in the known solutions, around 620 nm.

It is possible to use a standard multimode optical fibre similar to that used in telecommunications, as the light is not directly transmitted to the tip of the blade but to an optical-to-electrical energy converter.

It is possible to include numerous connectors along the length of the blade to facilitate assembly and repair.

Although this invention has been described entirely in connection with the preferred embodiments, these should not be considered as limitative, with the possibility of introducing modifications within the scope defined in the following claims:

The invention claimed is:

1. A wind turbine that includes a rotor made up of one or several blades connected to a hub (13), in which at least one blade (11) includes a lighting module (21) on the tip of the blade (11), characterised in that this lighting module (21) is supplied by a device that includes a light emitter (23) located in the hub (13) or in the blade root area (11), an optical-to-electrical energy converter (27) connected directly to this lighting module (21) and an optical energy conductor (25) that does not conduct electrical energy and that runs from the light emitter (23) to the converter (27).

2. A wind turbine according to claim 1, characterised in that it also includes a specific lightning protection device of this lighting module (21) and converter (27) assembly connected to the general lightning protection device of the blade (11).

3. A wind turbine according to claim 1, characterised in that the light emitting device (23) is a light emitting laser with a wavelength within the range 750-950 nm, the conductor (27) is a multimode fibre optic cable and the converter (25) is a photovoltaic cell.

4. A wind turbine according to claim 3, characterised in that this fibre optic cable is positioned inside the blade (11) and stuck to it.

5. A wind turbine according to claim 3, characterised in that this fibre optic cable is divided into sectors joined by connectors (29).

6. A wind turbine according to claim 5, characterised in that this blade (11) is a blade divided into parts and in that this fibre optic cable includes connectors (29) at least in the joint areas of the parts of the blade (11).

7. A wind turbine according to claim 1, characterised in that the lighting module (21) and the converter (27) are configured as a unitary assembly that can be replaced in case of failure.

* * * * *